United States Patent [19]

Schmidt

[11] Patent Number: 4,957,248
[45] Date of Patent: Sep. 18, 1990

[54] SEAT BELT RETRACTOR WITH COMFORT MECHANISM

[75] Inventor: Utz H. Schmidt, Utica, Mich.

[73] Assignee: TRW Vehicle Safety Systems Inc., Lyndhurst, Ohio

[21] Appl. No.: 308,824

[22] Filed: Feb. 9, 1989

[51] Int. Cl.$^5$ .................... A62B 35/00; B65H 75/48
[52] U.S. Cl. .................................................. 242/107.7
[58] Field of Search ............. 242/107.6, 107.7, 107.12; 180/268; 280/807; 297/475, 478

[56] References Cited

U.S. PATENT DOCUMENTS

| | | | |
|---|---|---|---|
| 3,834,646 | 9/1974 | Heath | 242/107.7 |
| 3,869,098 | 3/1975 | Sprecher | 242/107.6 X |
| 4,060,211 | 11/1977 | Takada | 242/107.7 |
| 4,227,661 | 10/1980 | King et al. | 242/107.7 |
| 4,509,708 | 4/1985 | Föhl | 242/107.7 |
| 4,651,947 | 3/1987 | Tsukamoto | 242/107.6 X |

*Primary Examiner*—Joseph J. Hail, III
*Attorney, Agent, or Firm*—Tarolli, Sundheim & Covell

[57] ABSTRACT

An apparatus for use with a vehicle seat belt retractor which includes a spindle having seat belt webbing wound thereon. The spindle is supported for rotation in belt retraction and withdrawal directions and is biased to rotate in the belt retraction direction. The apparatus comprises a ratchet wheel connected to the spindle for rotation with the spindle. A plurality of ratchet teeth extend from the ratchet wheel. A member is movable from a first position in which the member is spaced from the ratchet wheel to a second position in which the member engages one of the plurality of ratchet teeth on the ratchet wheel to block rotation of the ratchet wheel and the spindle in the belt retraction direction. A cam disk separate from the ratchet wheel prevents movement of the member to its second position during rotation of the spindle in the belt retraction at a speed above a predetermined speed.

7 Claims, 4 Drawing Sheets

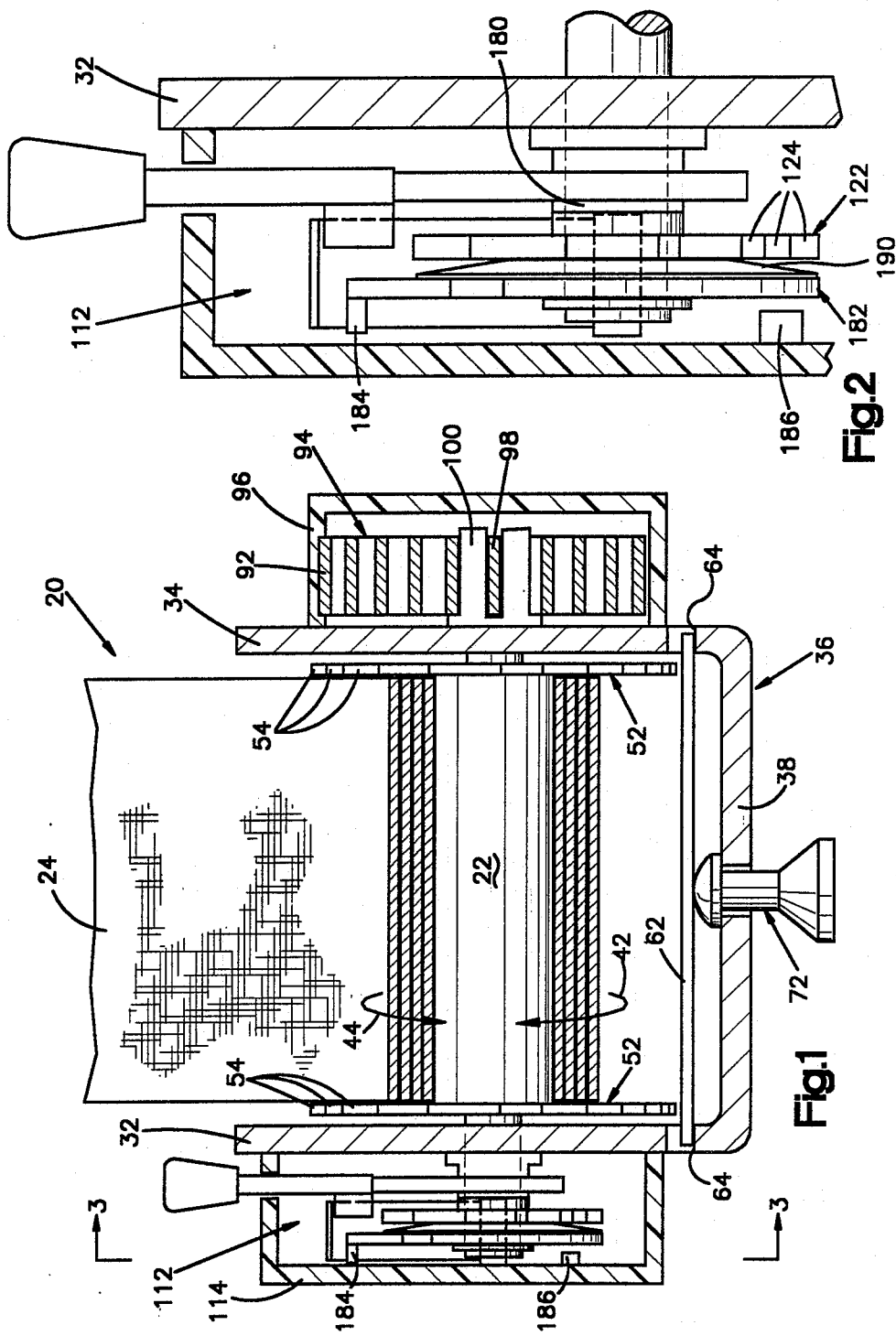

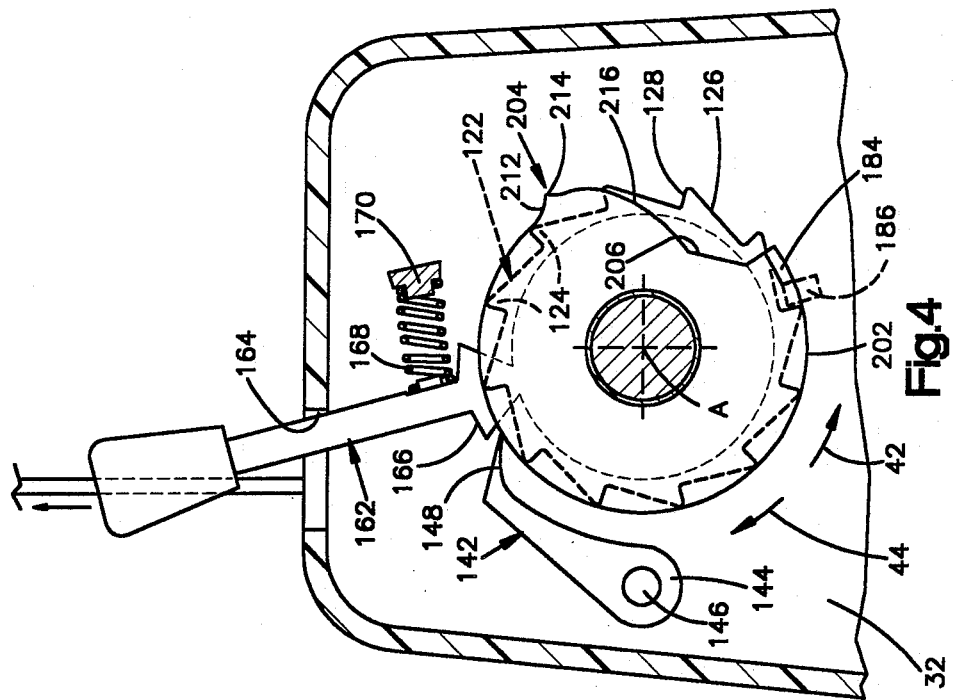
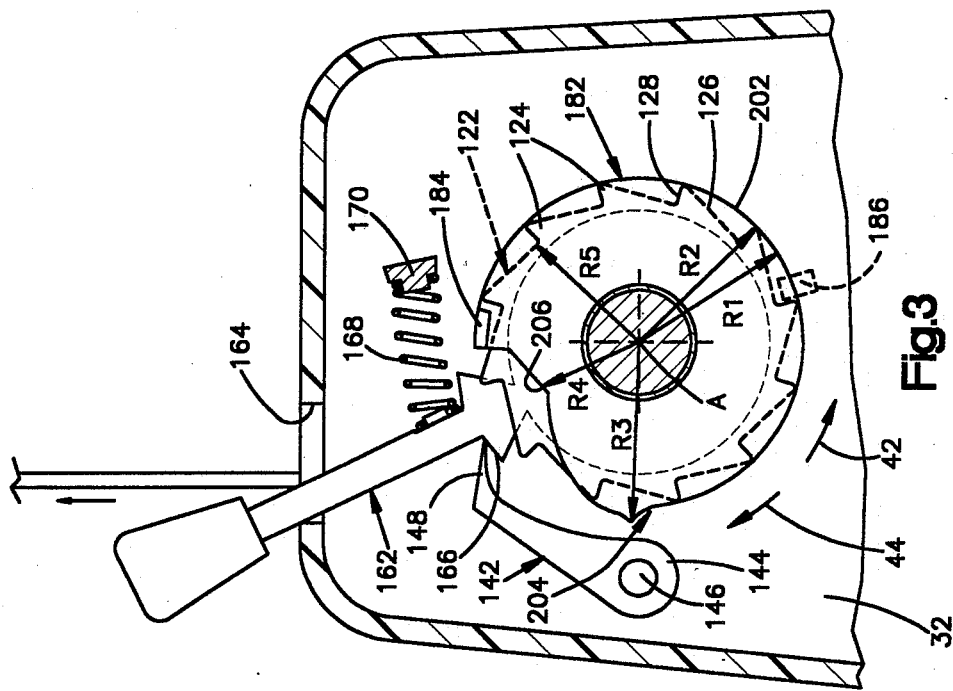

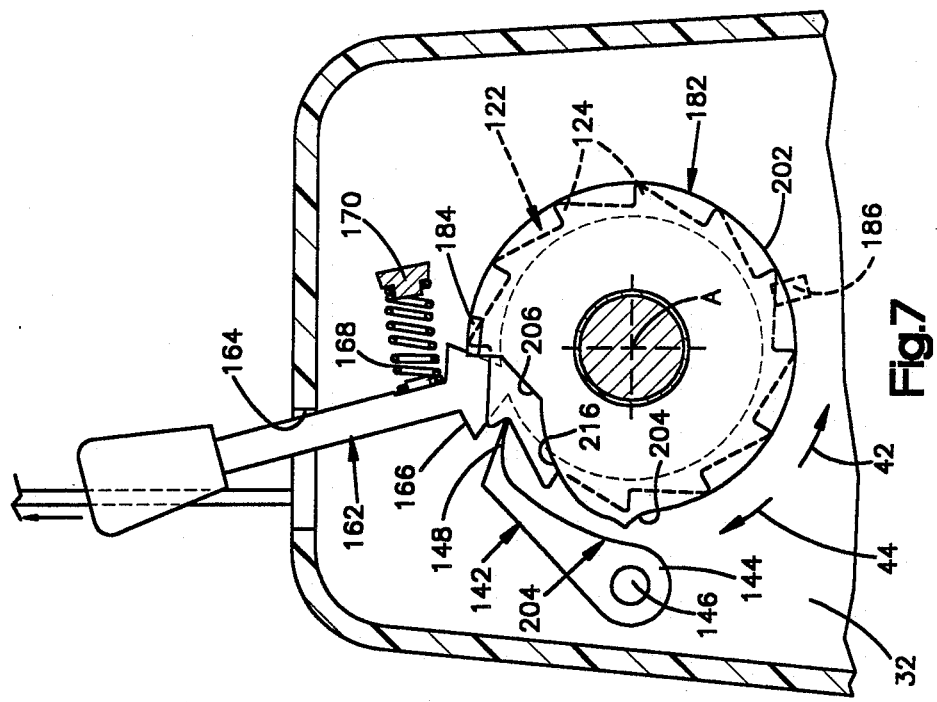

SEAT BELT RETRACTOR WITH COMFORT MECHANISM

BACKGROUND OF THE INVENTION

1. Field of the Invention

The present invention relates to a seat belt retractor having a comfort mechanism. Particularly, the present invention relates to a seat belt retractor having structure for preventing damage to parts of the comfort mechanism due to the of a wind-up spring.

2. Description of the Prior Art

Seat belt retractors having comfort mechanisms are known. U.S. Pat. No. 3,834,646 discloses a seat belt retractor having a comfort mechanism. The seat belt retractor disclosed in U.S. Pat. No. 3,834,646 includes a spool which is supported for rotation by a retractor frame. Seat belt webbing is connected at one end to the spool and is wound onto the spool for storage. The spool is rotatable in a belt withdrawal direction and in a belt retraction direction. A wind-up spring is connected between the spool and the retractor frame to bias the spool to rotate in the belt retraction direction. The wind-up spring tends to pull the belt webbing against the vehicle occupant.

The comfort mechanism of U.S. Pat. No. 3,834,646 counteracts the force of the wind-up spring and comprises a comfort ratchet wheel, separate from an emergency locking ratchet wheel, connected to the spool for rotation with the spool. A plurality of ratchet teeth extend radially outward from the comfort ratchet wheel. A comfort pawl is supported for pivotal movement by the retractor frame. The comfort pawl is movable from a position spaced from the comfort ratchet wheel to a position engaging one of the teeth on the comfort ratchet wheel. This engagement blocks rotation of the spool in a belt retraction direction. The wind-up spring is, thus, prevented from exerting a force through the spool and belt webbing against the vehicle occupant.

The comfort pawl and comfort ratchet wheel are preferably made to be relatively light in weight. Thus, the comfort pawl and comfort ratchet wheel are often made from plastic or a relatively thin metal and often do not have very high load-carrying capacities. When the seat belt retractor is fully extended, the wind-up spring exerts a maximum force attempting to retract the seat belt webbing. When the seat belt is suddenly released from the fully extended position, the wind-up spring causes the spool and ratchet wheel to rotate at a relatively high rotational velocity. If the comfort pawl engages the comfort ratchet wheel during rotation at this relatively high velocity, there is a chance that the comfort pawl and/or comfort ratchet wheel may damaged or broken.

U.S. Pat. No. 4,227,661 discloses a reeling device for a hose and which includes a structure for preventing damage to a pawl and ratchet wheel during high velocity rotation of a reel and the ratchet wheel by a wind-up spring. The reeling device is constructed similar to a seat belt retractor in that the reel is supported for rotation in retraction and withdrawal directions. A spring biases the reel to rotate in a retraction direction. A ratchet wheel is connected to the reel for rotation with the reel. The ratchet wheel has a plurality of recesses spaced thereabout. A pawl is supported for pivotal movement and may engage one of the recesses to block rotation of the reel in the retraction direction under the bias of the wind-up spring. The ratchet wheel also includes a plurality of cam surfaces each of which are located immediately adjacent and in front of a respective one of the recesses when the ratchet wheel rotates in the retraction direction. Each cam surface is configured to prevent the pawl from falling into one of the recesses during rotation of the spool at a velocity higher than a predetermined velocity.

Placing a cam surface ahead of a recess in a ratchet wheel in a seat belt retractor would not be feasible. This is because the close spacing between the teeth on the comfort ratchet wheel of the seat belt retractor does not permit such cam surfaces to be located between the teeth. If a cam surface was placed ahead of every tooth, the comfort ratchet wheel would have to be made prohibitively large in diameter to accommodate a reasonable number of teeth for a reasonable number of comfort positions.

SUMMARY OF THE INVENTION

The present invention is directed to a vehicle seat belt retractor having a comfort mechanism. The comfort mechanism includes a structure which prevents damage to the comfort locking pawl and comfort ratchet wheel due to a wind-up spring rotating the ratchet wheel at a relatively high velocity.

The vehicle seat belt retractor includes a spindle having seat belt webbing wound thereon. The spindle is supported for rotation in belt retraction and belt withdrawal directions. The spindle is biased by a wind-up spring to rotate in the belt retraction direction. The apparatus comprises a comfort ratchet wheel connected to the spindle for rotation with the spindle. A plurality of ratchet teeth extend from the comfort ratchet wheel. A member is movable from a first position in which the member is spaced from the comfort ratchet wheel to a second position in which the member engages one of the plurality of ratchet teeth on the comfort ratchet wheel. Rotation of the comfort ratchet wheel and the spindle in the belt retraction direction under the bias of the wind-up spring is, thus, blocked. Means separate from the comfort ratchet wheel prevents movement of the member to its second position during rotation of the spindle and comfort ratchet wheel in the belt retraction direction at a speed above a predetermined speed.

The means separate from the comfort ratchet wheel which prevents movement of the member to its second position comprises a cam member driven by rotation of the spindle. The cam member includes a cam surface which engages the member and propels the member in a direction toward its first position during rotation of the spindle and comfort ratchet wheel in the belt retraction direction at a speed greater than the predetermined speed. The cam member is located adjacent the comfort ratchet wheel and is rotatable about a common axis with the comfort ratchet wheel and spindle.

The cam surface includes a base surface having a radius greater than the largest radial extent of the crest of the ratchet teeth. The cam surface also includes a lobe having a radial extent greater than the radius of the base surface and a recess having a radius less than the radial extent of roots of the ratchet teeth. During rotation of the cam member in the belt retraction direction, the member is engageable with the lobe. The lobe is contoured to propel the member toward its first position when the spindle and comfort ratchet wheel rotate in the belt retraction direction at a speed above the predetermined speed. The member moves into the recess and to its second position when the spindle and comfort ratchet wheel rotate in the belt retraction direction at a speed below the predetermined speed.

BRIEF DESCRIPTION OF THE DRAWINGS

Further features of the present invention will become apparent to those skilled in the art to which the present invention relates from reading the following specification with reference to the accompanying drawings, in which:

FIG. 1 is a longitudinal cross-sectional view of a seat belt retractor having a comfort mechanism embodying the present invention;

FIG. 2 is an enlarged cross-sectional view of a portion of the comfort mechanism of FIG. 1;

FIG. 3 is a view of the retractor of FIG. 1, taken approximately along line 3—3 in FIG. 1; and FIGS. 4–7 are views similar to FIG. 3 with parts in different positions.

DESCRIPTION OF A PREFERRED EMBODIMENT

Figure 5:
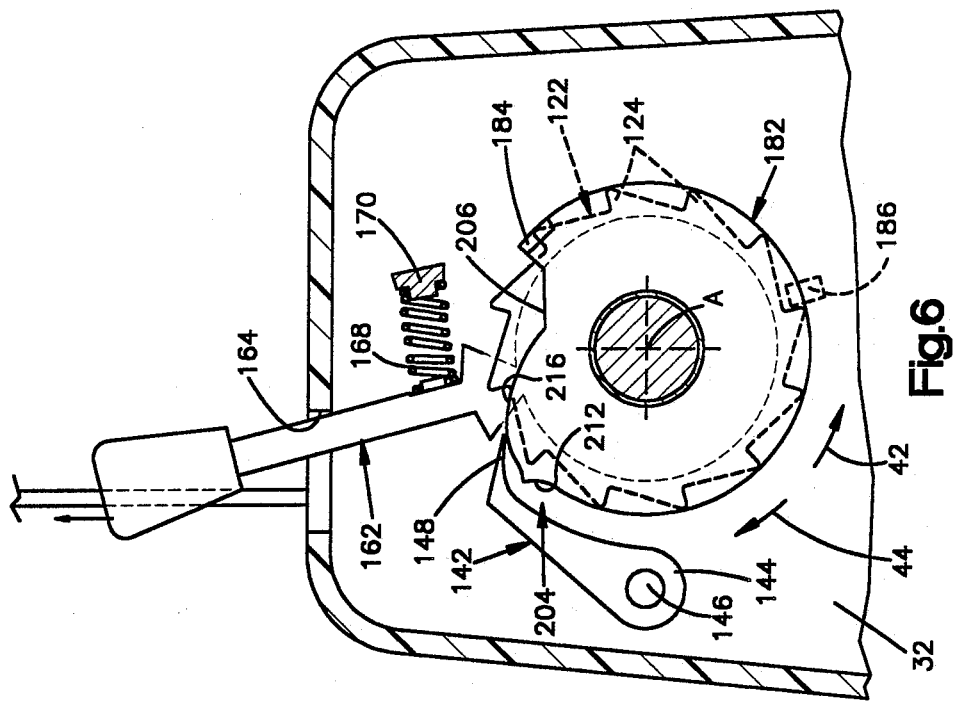

A seat belt retractor 20 for a vehicle is illustrated in FIG. 1. The retractor 20 includes a spindle 22. Belt webbing 24 is attached at one end to the spindle 22 and wound on the spindle for storage. The spindle 22 is supported for rotation by sides 32, 34 of a retractor frame 36. The frame 36 is a generally U-shape metal frame in which the frame sides 32, 34 are interconnected by a base portion 38. The spindle 22 is supported for rotation in a belt retraction direction 42 and a belt withdrawal direction 44.

A pair of emergency locking ratchet wheels 52 are connected to the spindle 22 axially inward of the frame sides 32, 34 and rotate with the spindle. A plurality of ratchet teeth 54 extend radially outward from each of the ratchet wheels 52. An emergency locking pawl 62 is supported for pivotal movement at axially opposite ends in openings 64 in the frame sides 32, 34. Upon pivotal movement, the pawl 62 engages a ratchet tooth 54 on each of the ratchet wheels 52 to block rotation of the spindle 22 in the belt withdrawal direction 44. Thus, withdrawal of the belt webbing 24 from the retractor 20 is blocked.

An inertia member 72 is supported for pivotal movement by the base portion 38 of the frame 36. When the vehicle, in which the retractor 20 is used, decelerates at a rate above a predetermined rate, the inertia member 72 pivots from the unactuated position illustrated in FIG. 1. Pivotal movement of the inertia member 72 causes the pawl 62 to pivot toward the ratchet wheels 52. It will be apparent that although the pawl 62 is actuated to block the spindle 22 against rotation in a belt withdrawal direction 44 in response to vehicle deceleration, the pawl could be actuated to block the spindle 22 in response to withdrawal of the seat belt webbing 24 at a rate of acceleration above a predetermined rate if so desired by any one of a multitude of known "web sensitive" mechanisms.

An outer end 92 of a coiled wind-up spring 94 is connected to a spring housing 96. The spring housing 96 is attached to the frame side 34. An inner end 98 of the wind-up spring 94 is attached to an axial extension 100 fixed to the spindle 22. The wind-up spring 94 biases the spindle 22 to rotate in the belt retraction direction 42. When the belt webbing 24 is withdrawn from the retractor 20 and is buckled about an occupant, the force of the wind-up spring 94 tends to pull the belt webbing 24 against the occupant. The force of the wind-up spring 94 acting through the belt webbing 234 may result in an uncomfortable feeling for the occupant. The wind-up spring 94 exerts a biasing force that increases in proportion to the amount of belt webbing 24 withdrawn from the retractor 20.

The retractor 20 includes a tension relief or comfort mechanism 112 which is operable between a manually actuated condition and an unactuated condition. When the comfort mechanism 112 is in its actuated condition, rotation of the spindle 22 in the belt retraction direction 42 under the bias of the wind-up spring 94 is blocked. Thus, the force of the wind-up spring 94 is not transmitted through the belt webbing 24 and transmitted against the occupant. When the comfort mechanism 112 is in its unactuated condition, the comfort mechanism is ineffective to block rotation of the spindle 22 in the belt retraction direction 42 due to the bias of the wind-up spring 94.

The comfort mechanism 112 is located on a side of the retractor 20 axially opposite the wind-up spring 94 and within a housing 114. The comfort mechanism 112 (FIGS. 2 and 3) includes a comfort ratchet wheel 122 fixed to and rotatable with the spindle 22. A plurality of ratchet teeth 124 extend radially outwardly from the comfort ratchet wheel 122. Each of the plurality of ratchet teeth 124 includes an angled face 126 and a radially extending face 128.

A comfort pawl 142 (FIG. 3) is supported for pivotal movement at one axially end portion 144 by a stub shaft 146 extending from the frame side 32. An axially opposite end portion 148 of the comfort pawl 142 is pivotable from a position spaced away from the comfort ratchet wheel 122, as illustrated in FIG. 3, to a position engaging one of the plurality of ratchet teeth 124 on the comfort ratchet wheel, as illustrated in FIG. 7. When the axial end portion 148 of the comfort pawl 142 engages a radial extending surface 128 of one of the ratchet teeth 124 on the comfort ratchet wheel 122, rotation of the spindle 22 and comfort ratchet wheel 122 in the belt retraction direction 42 is blocked. Thus, the force exerted by the wind-up spring 94 is not transmitted through the belt webbing 24 against the occupant. However, rotation of the spindle 22 and comfort ratchet wheel 122 in the belt withdrawal direction 44 is permitted because the axial end 148 of the comfort pawl 142 will ratchet over the angled edge 126 of each ratchet tooth 124 during rotation of the comfort ratchet wheel in the belt withdrawal direction.

An actuation lever 162 is supported for pivotal movement about the longitudinal central axis A of the spindle 22 by an axially extending portion 180 of the spindle. The actuation lever 162 has a portion extending through a slot 164 in the comfort mechanism housing 114. The actuation lever 162 is manually movable from the position illustrated in FIG. 3 in which the comfort mechanism 112 is unactuated to the position illustrated in FIG. 4 in which actuation of the comfort mechanism is initiated. A spring 168 is located between the actuation lever 162 and a projection 170 extending from the frame side 32. The spring 168 biases the actuation lever 162 toward the position illustrated in FIG. 3. The actuation lever 162 includes a surface 166 which holds the axial end portion 148 of the comfort pawl 142 so the axial end portion 148 is spaced away from the comfort ratchet wheel 122, as illustrated in FIG. 3.

To actuate the comfort mechanism 112, the actuation lever 162 is manually moved from the position illustrated in FIG. 3 to the position illustrated in FIG. 4 against the bias of the spring 168. The lever 162 is manually moved an amount sufficient to permit the axial end portion 148 of the comfort pawl 142 to disengage the surface 166. The axial end portion 148 of the comfort pawl 142 is allowed to pivot toward the ratchet wheel 122 due to gravity. However, it will be apparent that the comfort pawl 142 may be spring biased toward engagement with the ratchet wheel 122 and may then be oriented in different orientations than the orientation illustrated in FIG. 3 when the comfort mechanism 112 is unactuated.

The comfort pawl 142 and the comfort ratchet wheel 122 are made of a relatively light material. The material may be a plastic, such as nylon. If the axial end portion 148 of the comfort pawl 142 engages the comfort ratchet wheel 122 when the spindle 22 rotates in the belt retraction direction 42 at a relatively high velocity due to the bias of the wind-up spring 94 when the belt webbing 24 is substantially fully withdrawn, the comfort pawl and/or the ratchet teeth 124 on the comfort ratchet wheel may be damaged or broken. If the comfort pawl 142 and comfort ratchet wheel 122 are damaged or broken, the comfort mechanism 112 may be unusable or ineffective.

The comfort mechanism 112, therefore, utilizes an apparatus according to the present invention for protecting the comfort pawl 142 and comfort ratchet wheel 122 from damage due to the spindle 22 and comfort ratchet wheel rotating in the belt retraction direction 42 at a relatively high speed due to the biasing force of the wind-up spring 94. The apparatus for protecting the comfort mechanism 112, thus, comprises a cam disk 182. The cam disk 182 is supported for rotation by the axially extending portion 180 of the spindle 22. The cam disk 182 is free to rotate relative to the spindle 22 and comfort ratchet wheel 122. A belville spring 190 is located between the comfort ratchet wheel 122 and cam disk 182. The belville spring 190 frictionally drives the cam disk 182 between limits in response to rotation of the comfort ratchet wheel 122.

A stop 184 (FIG. 2) extends axially outward from the cam disk 182 and is engageable with a stop 186 extending from the comfort housing 114. When the seat belt webbing 24 is withdrawn from the retractor 20, the cam disk 182 rotates about the axis A in the belt withdrawal direction 44 until the stop 184 extending from the cam disk 182 engages the stop 186 extending from the housing 114, as illustrated in FIG. 4. Any further rotation of the cam disk 182 in the belt withdrawal direction 44 is blocked at the position illustrated in FIG. 4. The cam disk 182 is rotatable about the axis B in the belt retraction direction 42 from the position illustrated in FIG. 4 an amount slightly less than 360 degrees before the stop 184 engages the other side of the stop 186 on the housing 114.

An arcuate base surface 202 of the cam disk 182 has a radius R1 slightly larger than the largest radial extent R2 of any one of the ratchet teeth 124. Thus, the arcuate base surface 202 prevents the axial end portion 148 of the comfort pawl 142 from engaging the comfort ratchet wheel 122. The cam disk 182 also includes a cam lobe 204 and a recess 206. The cam lobe 204 has a radius R3 larger than the radius R1 of the base surface 202. The recess 206 has a radius R4 at its lowest point slightly less than the smallest radius R5 of the ratchet teeth 124. Thus, the recess 206 permits the axial end portion 148 of the comfort pawl 142 to engage the ratchet wheel 122 when the recess 206 has rotated to a location adjacent the axial end portion 148 of the comfort pawl 142.

The cam lobe 204 is shaped to propel the axial end portion 148 of the comfort pawl 142 away from the ratchet wheel during rotation of the cam disk 182 and spindle 22 at a rotational speed greater than a predetermined rotational speed. The cam lobe 204 includes a leading face 212 (FIG. 4) which is the first surface of the cam lobe to engage the axial end portion 148 of the comfort pawl 142 during rotation of the cam disk 182 in the belt retraction direction 42. The leading face 212 of the cam lobe 204 is contoured to move the axial end portion 148 of the comfort pawl 142 in a direction away from the axis A when the cam disk 182 is rotating in the belt retraction direction 42.

The cam lobe 204 also includes a crest 214 and a trailing face 216. During rotation of the cam disk 182 in the belt retraction direction 42, the axial end portion 148 of the comfort pawl 142 is forced away from the axis A until the crest 214 passes the axial end portion 148. If the cam disk 182 (and, thus, the spindle 22 and comfort ratchet wheel 122) is rotating at a speed greater than a predetermined rotational speed when the crest 214 passes the axial end portion 148, the pivoting mass of the comfort pawl 142 and the contour of the leading face 212 cooperate to keep the axial end portion 142 of the comfort pawl moving away from the axis A. This prevents the axial end portion 148 of the comfort pawl 142 from entering the recess 206 and engaging the ratchet wheel 122 during rotation of the cam disk 182 in the belt retraction direction 42 at a speed greater than the predetermined speed. If the cam disk 182 (and, thus, the spindle 22 and comfort ratchet wheel 122) is rotating at a speed less than the predetermined rotational speed, the axial end portion 148 of the comfort pawl 142 follows the trailing face 216 of the cam lobe 204 into the recess 206 to engage a tooth 124 of the comfort ratchet wheel 122.

To operate the comfort mechanism 112, the seat belt webbing 24 must be extended about the occupant and buckled. The wind-up spring 94 pulls the belt webbing 24 against the occupant. The occupant then moves the actuation lever 162 from the position illustrated in FIG. 3 to the position illustrated in FIG. 4 so the axial end portion 148 of the comfort pawl 148 engages the base surface 202 of the cam disk 182. The occupant then withdraws some of the belt webbing 24 to rotate the spindle 22, comfort ratchet wheel 122, and cam disk 182 in the belt withdrawal direction 44 so the stop 184 on the cam disk 182 engages the stop 186 on the housing 114, as illustrated in FIG. 4. The occupant then allows the belt webbing 24 to be wound on the spindle 22 under the bias of the wind-up spring 94 which rotates the spindle in the belt retraction direction 42. If the occupant releases the belt webbing 24 when the belt webbing is fully extended, the spindle 22 rotates at a relatively high speed because of the wind-up spring 94. The occupant may also control the speed of retraction of the belt webbing 24 by holding onto the belt webbing.

As the spindle 22 rotates in the belt retraction direction 42, the axial end portion 148 of the comfort pawl 142 rides up the leading face 212 of the cam lobe 204. If the spindle 22, comfort ratchet wheel 122 and cam disk 182 are rotating at a rate above a predetermined rate which is determined to be sufficient to break the components, the mass of the end portion 148 of the comfort pawl 142 continues in motion away from the ratchet wheel by the cam lobe because of the contour of the leading face, as illustrated in FIG. 5. As the spindle 22 rotates above the predetermined speed, the spindle rotates too fast in the retraction direction 42 to allow enough time for gravity to pivot the axial end portion 148 of the comfort pawl 142 into the recess 206. This assures that the high forces of the wind-up spring 94 will not be transmitted between the comfort pawl 142 and comfort ratchet wheel 122 which may result in breakage or damage.

Figure 6:
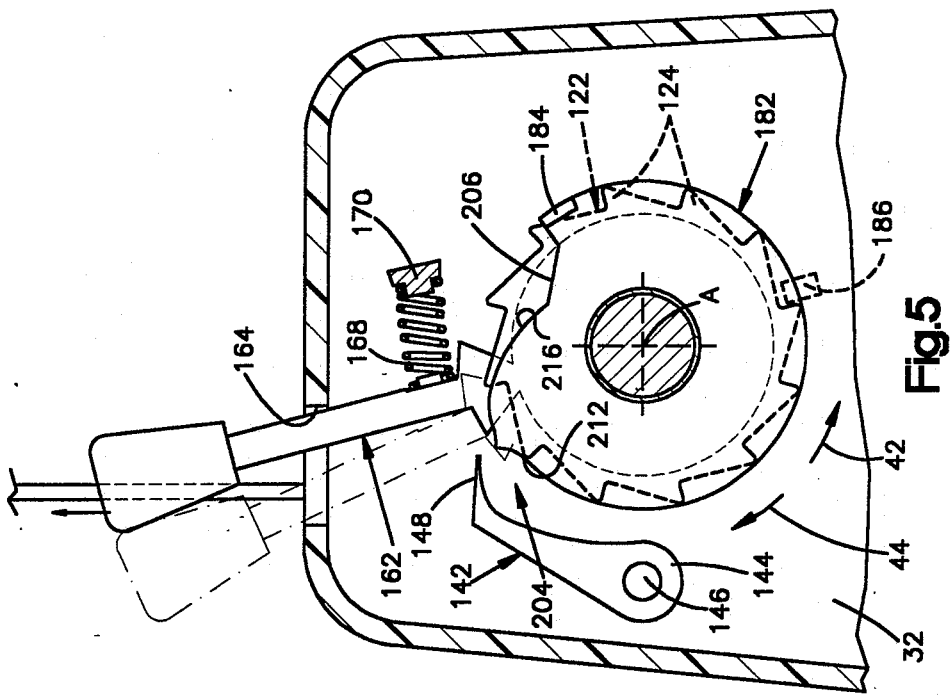

If the spindle 22 is rotating in the belt retraction 42 at a rate below the predetermined rate, the axial end portion 148 of the comfort locking pawl 142 follows the trailing face 216 of the cam lobe 204 into the recess 206, as illustrated in FIG. 6. The axial end portion 148 of the comfort locking pawl 142 engages a surface 128 of one ratchet tooth 124 of the comfort ratchet wheel 122, as illustrated in FIG. 7. Rotation of the spindle 22 in the belt retraction direction 42 under the bias of the wind-up spring 94 is, thus, blocked.

From the above description of a preferred embodiment of the invention, those skilled in the art will perceive improvements, changes and modifications. Such improvements, changes and modifications within the skill of the art are intended to be covered by the appended claims.

Having described a specific preferred embodiment, I claim:

1. A vehicle seat belt retractor including a spindle having seat belt webbing wound thereon, said spindle being supported for rotation in belt retraction and withdrawal directions, and means for biasing said spindle to rotate in the belt retraction direction, and further comprising:
   a ratchet wheel connected to said spindle for rotation with said spindle;
   a plurality of ratchet teeth extending from said ratchet wheel;
   a pawl member movable from a first position in which said pawl member is spaced from said ratchet wheel to a second position in which said pawl member engages one of said plurality of ratchet teeth on said ratchet wheel to block rotation of said ratchet wheel and said spindle in the belt retraction direction; and
   means separate from said ratchet wheel for preventing movement of said pawl member to its second position during rotation of said spindle in the belt retraction direction at a speed above a predetermined speed, comprising a cam member driven by rotation of said spindle, said cam member including a cam surface for engaging said pawl member and propelling said pawl member in a direction toward its first position during rotation of said spindle in the belt retraction direction at a speed greater than the predetermined speed, said cam member being located adjacent said ratchet wheel and rotatable about a common axis with said ratchet wheel, said cam surface including a base surface having a radius greater than the largest radial extent of the crests of said ratchet teeth, a lobe having a radial extent greater than the radius of said base surface and a recess having a radius less than the radial extent of the roots of said ratchet teeth, said pawl member being engageable with said base surface of said cam member intermediate its first and second positions and during rotation of said cam member in the belt retraction direction said pawl member being engageable with said lobe, said lobe being shaped to propel said pawl member toward its first position when said spindle rotates in the belt retraction direction above the predetermined speed and said pawl member entering said recess and moving to its second position when said spindle rotates in the belt retraction direction below the predetermined speed.

2. A seat belt retractor including a spindle having webbing wound thereon, said spindle being supported for rotation in belt retraction and belt withdrawal directions, and means for biasing said spindle to rotate in the belt retraction direction, and further comprising:
   a ratchet wheel connected to the spindle for rotation with said spindle;
   a plurality of ratchet teeth extending from said ratchet wheel;
   a pawl member movable from a first position in which said pawl member is spaced from said ratchet wheel to a second position in which said pawl member engages one of said plurality of ratchet teeth to block rotation of said spindle in the belt retraction direction; and
   a cam member driven by rotation of said spindle and including a cam surface for engaging said pawl member to propel said pawl member in a direction toward its first position during rotation of said spindle in the belt retraction direction at a speed greater than a predetermined speed, said cam member being located adjacent said ratchet wheel and rotatable about a common axis with said ratchet wheel, said cam surface including a base surface having a radius greater than the largest radial extent of the crests of said ratchet teeth, a lobe having a radial extent greater than the radius of said base surface and a recess having a radius less than the radial extent of the roots of said ratchet teeth, said lobe including a leading face, a crest and a trailing face, said pawl member being engageable with said base surface of said cam member intermediate its first and second positions and during rotation of said cam member in the belt retraction direction said pawl member being engageable with said leading face of said lobe, said lobe being contoured to propel said pawl member toward its first position during rotation of said spindle in the belt retraction direction above the predetermined speed and said pawl member following the trailing edge of said lobe into said recess to move to its second position during rotation of said spindle in the belt retraction direction below the predetermined speed.

3. A seat belt retractor including a spindle having seat belt webbing wound thereon, said spindle being supported for rotation in belt retraction and withdrawal directions, and means for biasing said spindle to rotate in the belt retraction direction, and further comprising:
   a ratchet wheel connected to said spindle for rotation with said spindle;
   a plurality of ratchet teeth extending from said ratchet wheel;
   a pawl member movable from a first position in which said pawl member is spaced from said ratchet wheel to a second position in which said pawl member engages one of said plurality of ratchet teeth on said ratchet wheel to block rotation of said ratchet wheel and said spindle in the belt retraction direction; and a cam separate from said ratchet wheel and rotatable with said spindle and having a surface which moves the pawl in a direction away from the second position when the spindle rotates in the belt retraction direction at a speed above a predetermined speed to prevent movement of said pawl member to its second position and said cam enabling movement of said pawl member to its second position in response to rotation of said spindle in the belt retraction direction at a speed below a predetermined speed.

4. A seat belt retractor including a spindle having webbing wound thereon, said spindle being supported for rotation in belt retraction and belt withdrawal directions, and means for biasing said spindle to rotate in the belt retraction direction, and further comprising:

a ratchet wheel connected to said spindle for rotation with said spindle;

a plurality of ratchet teeth extending from said ratchet wheel;

a pawl member movable from a first position in which said pawl member is spaced from said ratchet wheel to a second position in which said pawl member engages one of said plurality of ratchet teeth to block rotation of said spindle in the belt retraction direction; and a cam member driven by rotation of said spindle and having a recess into which said pawl member can move when said cam member is rotating to thereby attain its second position, said cam member having a cam surface which during rotation of said cam member and said spindle in the belt retraction direction at a speed greater than a predetermined speed engages and propels said pawl member radially outwardly into the first position, wherein the predetermined speed is that speed of rotation above which said rotating cam surface propels said pawl member sufficiently far from said ratchet wheel so that said recess in said cam member is spaced angularly from said pawl member and said pawl member can not enter said recess as said pawl member moves back toward said ratchet wheel.

5. The apparatus set forth in claim 4 further including a lever supported for movement on said spindle and having a surface for holding said pawl member in its first position when said lever is in an unactuated position and being movable to an actuated position allowing said pawl member to move toward its second position.

6. The apparatus set forth in claim 5 wherein said lever is supported for pivotal movement about the common axis of rotation of said cam member and said ratchet wheel.

7. The apparatus set forth in claim 6 further including means for biasing said lever to its unactuated position.

* * * * *